Figure 3:
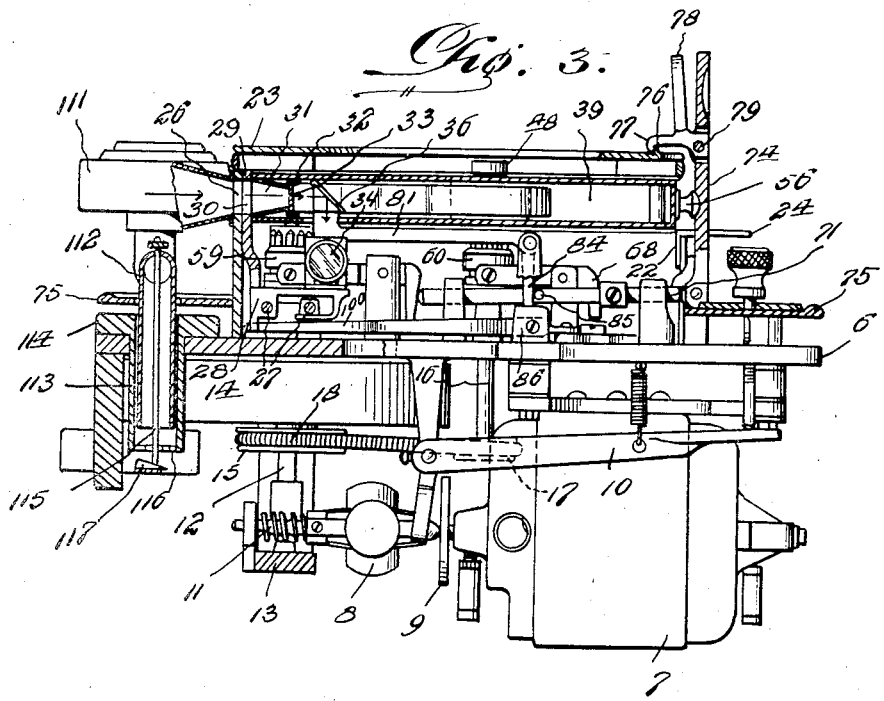

May 14, 1929.  F. VON MADALER  1,713,503
MEANS FOR REPRODUCING SOUND AND MOTION IN SYNCHRONISM
Original Filed June 1, 1923  5 Sheets-Sheet 1
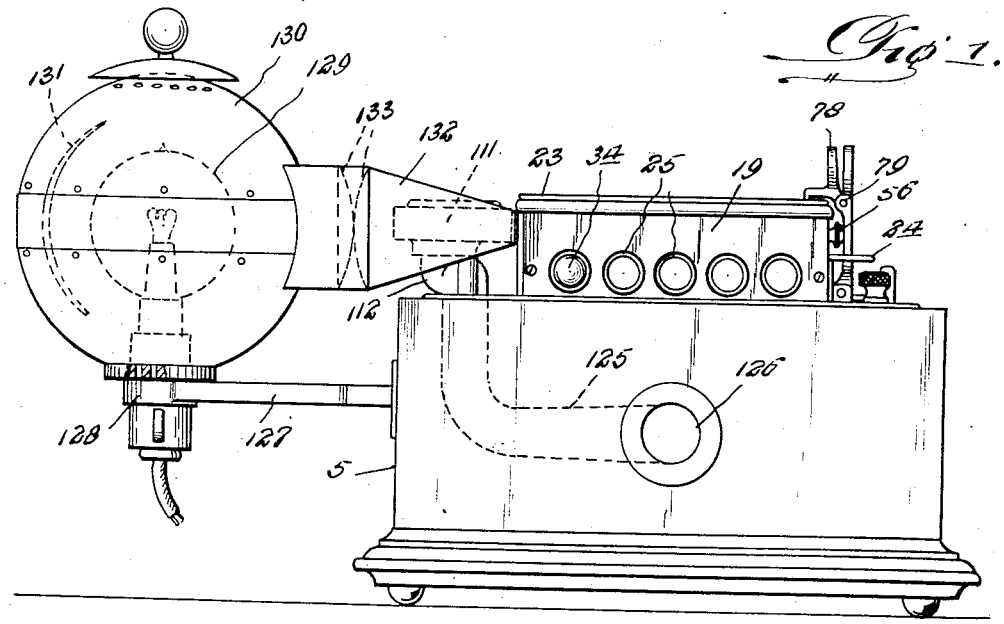
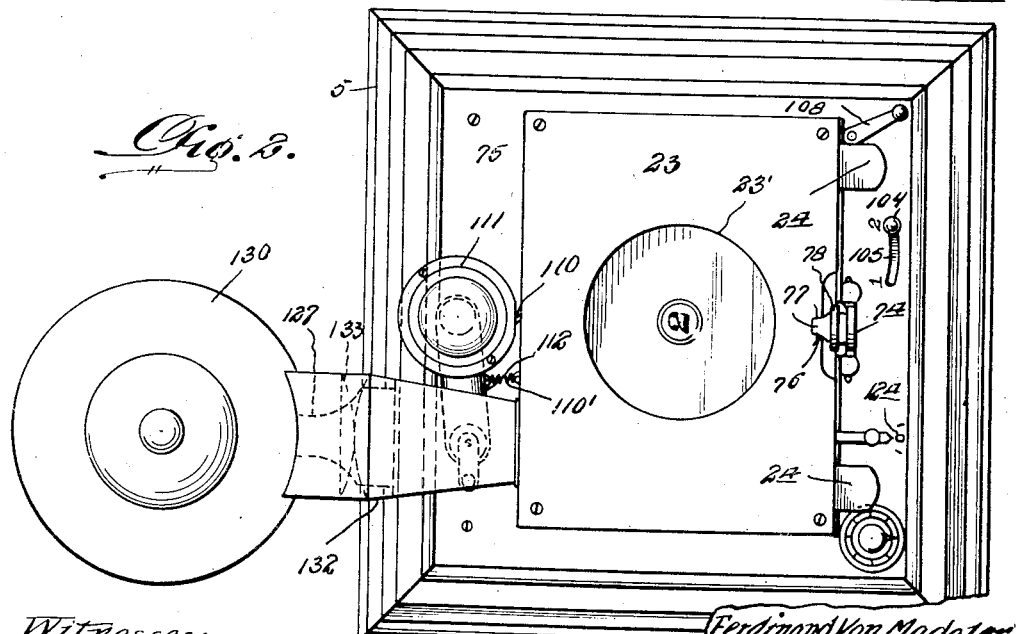

May 14, 1929.　　　F. VON MADALER　　　1,713,503
MEANS FOR REPRODUCING SOUND AND MOTION IN SYNCHRONISM
Original Filed June 1, 1923　　5 Sheets-Sheet 2

Ferdinand Von Madaler,
Inventor

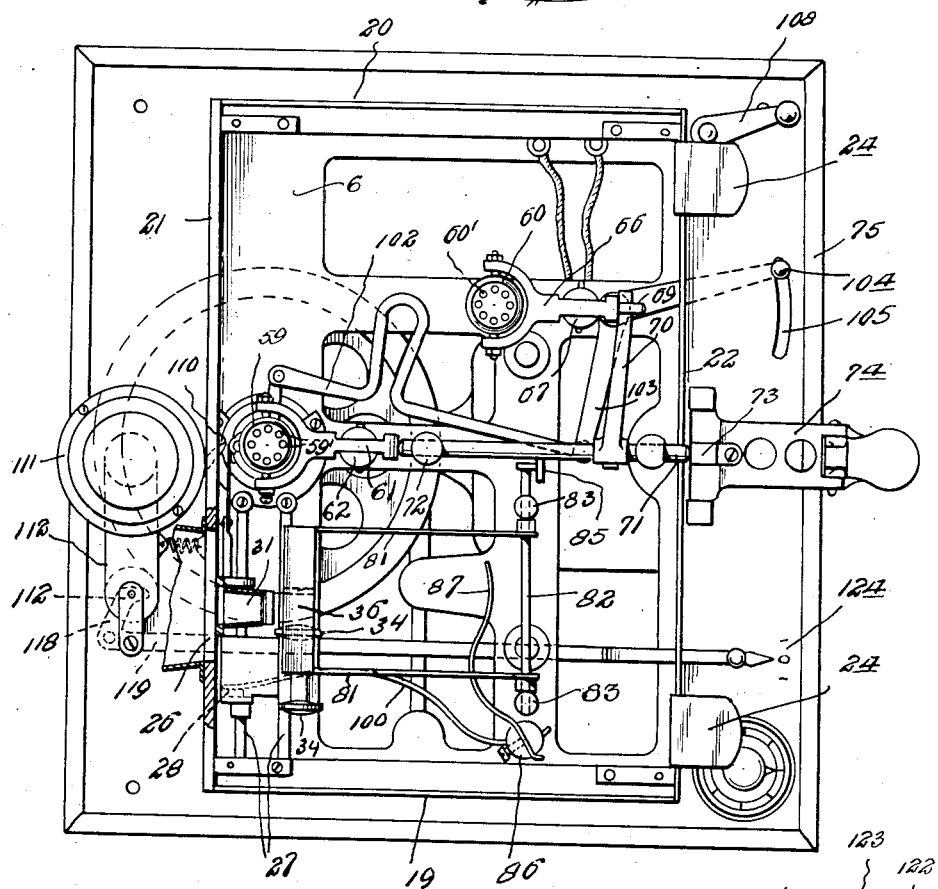

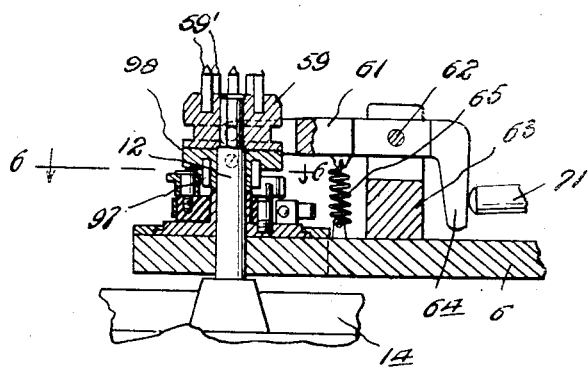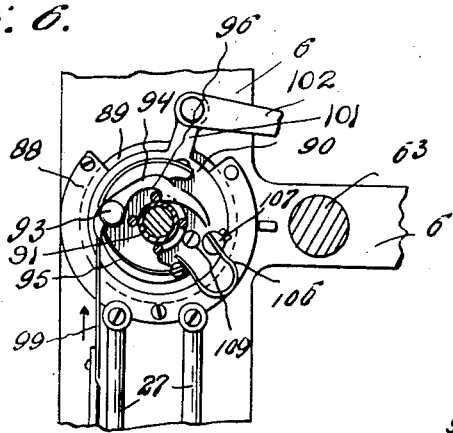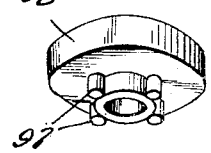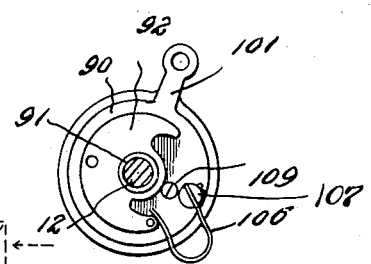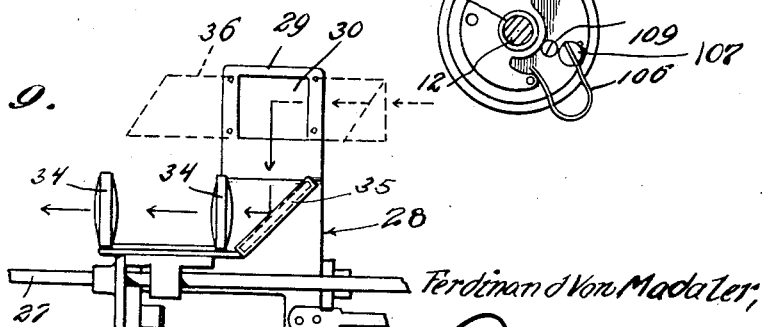

May 14, 1929. F. VON MADALER 1,713,503
MEANS FOR REPRODUCING SOUND AND MOTION IN SYNCHRONISM
Original Filed June 1, 1923 5 Sheets-Sheet 5
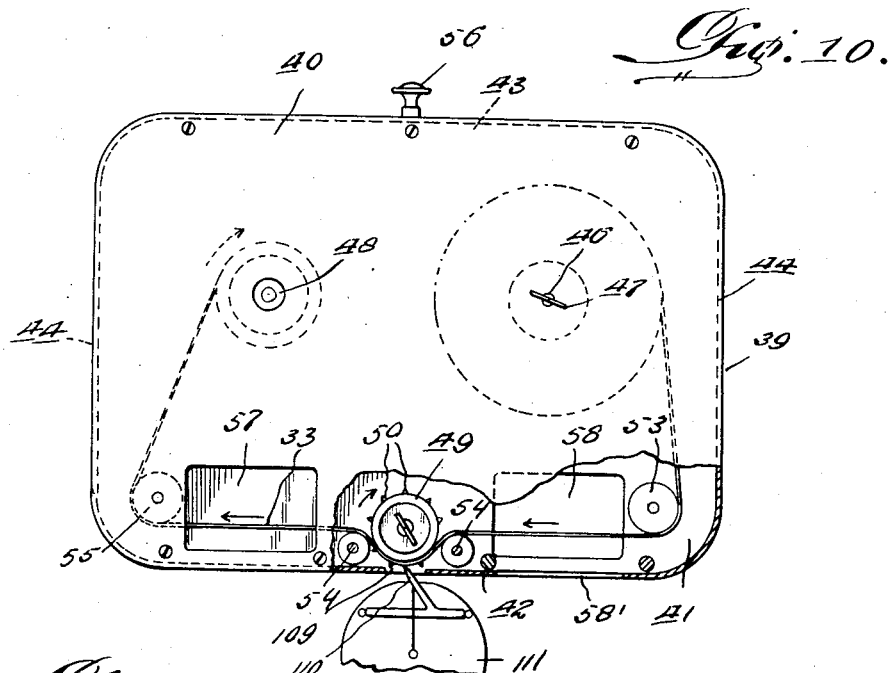
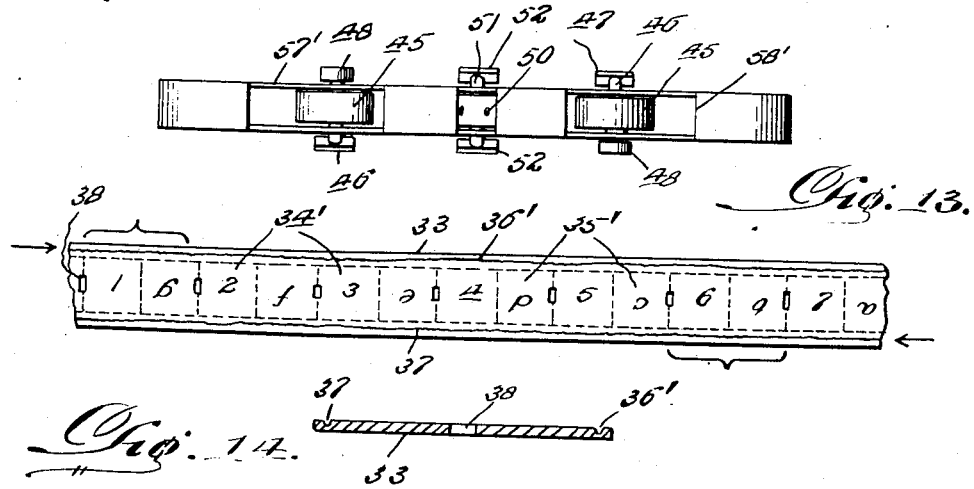
Ferdinand Von Madaler,
INVENTOR.
WITNESSES
ATTORNEYS.

Patented May 14, 1929.

1,713,503

UNITED STATES PATENT OFFICE.

FERDINAND VON MADALER, OF HAMPTON BAYS, NEW YORK, ASSIGNOR TO VISION-TONE CORPORATION, OF NEW YORK, N. Y., A CORPORATION OF NEVADA.

MEANS FOR REPRODUCING SOUND AND MOTION IN SYNCHRONISM.

Application filed June 1, 1923, Serial No. 642,767. Renewed September 28, 1928.

The present invention relates to an apparatus for simultaneously reproducing picture and sound records, thereby producing what are commonly termed "talking pictures," the object of the invention being to provide a device of this character that employs in conjunction therewith a moving picture film that is also the carrier of the sound waves.

Many attempts have been made to secure with the reproduction of moving pictures, the reproduction of sounds co-related therewith. Almost all of these attempts have been made by operating the moving picture film in conjunction with the ordinary phonograph. The difficulty of employing a machine of this nature to produce a sound co-related with the film, is that the phonograph must of necessity, be practically a separate machine from the projector whereby the pictures are thrown upon the screen and that with the phonograph it is practically impossible to secure a sound record which shall be conterminous with the film. As is well known, the sound record that is to-day universally employed will run generally no longer than five or ten minutes, whereas it may take from fifteen minutes to half hour to project a single film. Further than this, it is almost an impossibility to run the phonograph in synchronism with the film, and naturally, this is a very vital necessity for the proper co-relation of the sound record with the picture. Again, should the film run off or break, the phonograph must be stopped, and it is almost impossible to again adjust the film in proper synchronism with the sound record. An operative connection between the sound reproducing mechanism and the moving picture projecting mechanism will not secure a complete correspondence and co-relation therebetween, for the reason that the film is liable to slip and tighten or loosen upon the reels and it would be unusually difficult to so adjust the sound record as to correspond accurately with the motion of the pictures. It is, of course, absolutely necessary to secure an accurate correspondence of the sound with the event with which the sound is co-related, otherwise the effect would be spoiled entirely.

I have completely overcome the above objections by providing in combination with my machine a picture strip that has directly engraved thereon the sound record, so that the pictures and the corresponding sounds will at all times be in fixed relation to each other, taken simultaneously, reproduced simultaneously, and with no possible chance of the sound record having its relation with the picture record in any way changed.

Further, this film of which I have spoken carries two separate picture series, the pictures of each series being alternately arranged upon the picture squares of the film, the picture squares of one series beginning at one end of the film, while the picture squares of the other series begin at the opposite end of the film, the opposite sides of the film bearing the sound waves of each picture series.

An outstanding object of this invention is the provision of a sound and motion reproducing machine that includes a film carrier that may be reversely arranged in the machine for permitting of the projection of either desired picture series as well as the reproduction of the sounds incident thereto.

An important object of the invention is the provision of such a machine wherein the picture projecting mechanism thereof is entirely devoid of any complicated shutter mechanism and one that may employ as a source of illumination an ordinary stereopticon bulb that throws off comparatively little heat which will preclude the liability of the film from catching fire, a fact which is always pregnant in moving picture machines now universally employed due to the high degree of heat thrown off by the usual carbon lights.

A still further and important object of this invention is to provide a sound and motion reproducing machine that embodies a small compact structure that may be readily transported from place to place by a single person, the machine being comparatively simple of construction and one that may be manufactured and marketed at such a cost as to enable the same to be used in homes as is now the case with ordinary phonographs.

The invention will be best understood from a consideration of the following detailed description, taken in connection with the accompanying drawings, forming a part of the specification with the understanding that the invention is not confined to any strict conformity with the showing of the drawings, but may be changed and modified as long as such changes and modifications mark no material departure from the salient features of the invention as expressed in the appended claims.

In the drawings:—

Figure 1—is a front elevation of my improved machine.

Figure 2—is a top plan view thereof.

Figure 3—is an enlarged detail vertical cross-section of the mechanism constituting the machine removed from its casing, the source of illumination being also removed.

Figure 4—is an enlarged view similar to Figure 2, the cover plate, the film carrier and source of illumination being removed.

Figure 5—is a fragmentary detail cross-section through a certain portion of the machine.

Figure 6—is a cross section taken substantially upon the line 6—6 of Figure 5, and looking downwardly in the direction of the arrows.

Figure 7—is a bottom perspective of a certain element included in the machine.

Figure 8—is a top plan view of certain co-related elements embodied in this device.

Figure 9—is a rear elevation of a rectilinearly movable carriage mechanism that includes a plate member that is formed with an opening, this plate adapted to move across the light opening of the machine simultaneously with the movement of the film and then jump back to position forwardly of the next picture square of that particular series thereby permitting the projection of but one picture series, this carriage including a light reflecting mirror as well as a pair of light projecting lenses, this view also showing in dotted lines what I hereinafter term "a prism" that projects the light rays downwardly to the mirror and thence through the lenses.

Figure 10—is a plan view, partly in cross-section of the film box.

Figure 11—is a front elevation thereof.

Figure 12—is a perspective of an adjusting lever, whereby the sound box of the sound recording apparatus may be controlled so as to properly engage the stylus thereof into the sound groove of the moving picture film.

Figure 13—is a plan view of the picture and sound record employed in conjunction with the present invention.

Figure 14—is a detail transverse cross-section thereof, and

Figure 15:
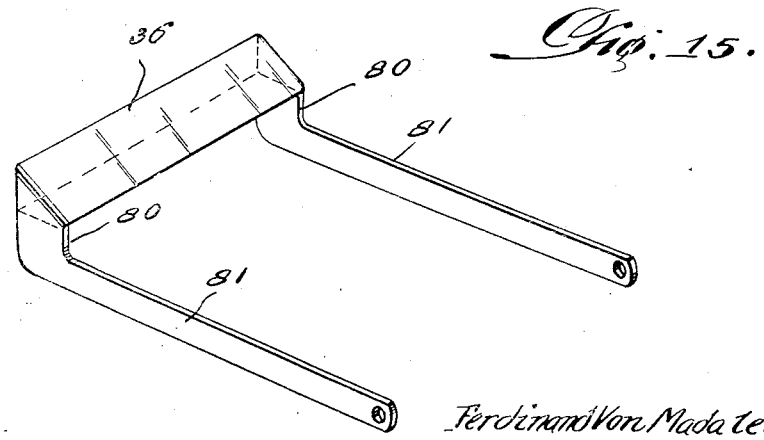

Figure 15—is a perspective of the before mentioned prism.

First, having reference to Figures 1 and 2, my device embodies the provision of a suitable casing 5 of any desirable material and design within which is detachably disposed the major portion of the mechanism constituting my invention. If desirable, this casing 5 may be equipped with a suitable form of lid, the same, however, being not at all material, and therefore not shown. With particular reference to the picture projecting mechanism, the same includes an open base plate 6 of suitable material from which is suspended an electric motor 7, the armature shaft of which is equipped with a speed governor 8 as well as a brake plate 9 that cooperates with a speed regulating mechanism designated generally 10, the same being of conventional design and therefore not specifically described.

The end of the armature shaft of said motor is equipped with a worm 11 which is intermeshed with a complementary gear upon the end of a vertical shaft 12 that is suitably journaled through the said base plate 6 as well as an under structure 13. This shaft 12 is substantially intermediate the front and rear ends of the base plate 6 and adjacent one side thereof, the same being equipped with a fly wheel 14 as well as a belt pulley 15.

Rearwardly of this shaft 12 and substantially intermediate the sides of said base plate 6 is a vertical shaft 16, the lower end of which is equipped with a belt pulley 17 of less circumference than that of the pulley 15 upon the shaft 12. The pulleys 15 and 17 are in substantial alinement with each other, and are operatively connected by a relatively loose spiral spring belt 18, which will permit of a slippage of the shaft 16 with respect to the shaft 12 for purposes presently to be set forth.

Super-posed upon the base plate 6 and maintained in position thereon in any manner desirable is a substantially rectangular shaped frame that embodies a front wall 19, rear wall 20, side walls 21 and 22, respectively, and a cover plate 23. It being noticed from a consideration of Figure 3 that the side wall 22 of the frame is of lesser height than the other walls for purposes to be presently set forth. The front and rear walls 19 and 20 of this frame are provided upon their inner sides with guide flanges that are in alinement with the upper edge of the side wall 22, these guide flanges adapted for supporting the opposite ends of the film box shown in Figures 10 and 11 when the same is positioned within the frame, it being understood in this connection that while inserting the film carrier within the frame or removing the same therefrom, it is necessary that the said cover plate 23 be removed. As a means for assisting the guiding of the film carrier into the frame, the said side wall 22 of the frame is provided adjacent its opposite ends with outwardly extending rest plates 24 that are in alinement with the said guide flanges of the frame and are adapted for receiving the front end of the film carrier preliminary to the insertion of the same within the frame.

The front and rear walls 19 and 20 of this frame are provided with a row of spaced and circular shaped openings 25 as more clearly shown in Figure 1, these openings being provided for considerably lessening the weight of the machine as well as for providing heat outlets, the opening 34 in the front wall 19 adjacent the side wall 21 of the frame being for the purpose of permitting the projection of the light rays from the source of illumination that have passed through the picture.

The side wall 21 of the said frame is provided adjacent the front wall 19 with a relatively elongated light opening 26 and slidably disposed upon a pair of guide bars 27 that are suitably anchored upon the said base plate 6 and directly rearwardly of the light opening 26 in the said side wall 21 of the frame is what I hereinafter term a carriage 28. This carriage comprises as more clearly shown in Figure 9, a vertically directed plate 29 that is formed at its upper end with an opening 30 of substantial square shape, this opening being in direct alinement with the said light opening 26 of the side wall 21 of the frame. Surrounding this opening 30 and secured in any manner desirable to the said plate 29 is an inwardly extending light hood 31, that has its inner end formed with upper and lower fingers 32 between which is slidable the film designated in Figure 3, 33. The walls of this hood converge inwardly and the inner end of the same is of dimensions substantially equivalent to the dimensions of the picture square of the picture film. The said carriage designated generally 28 also comprises a pair of spaced lenses 34, Figure 9, that are disposed beneath the said opening 30 in the plate 29 at one side thereof. Directly beneath the light opening 30 of the plate 29 is an inclined mirror 35, which is in direct longitudinal alinement with the said lenses 34.

Immediately rearwardly of the said carriage 28 is a prism 36 of a length substantially equivalent or slightly greater than the light opening 26 in the wall 21 of the frame, whereby as the light projects through the said opening through a source of illumination to be hereinafter described and after the same has passed through the film 33 the same will be projected downwardly onto the mirror 35 and thence through the lenses 34 out through the said opening 25 of the wall 19 of the frame onto a suitable screen.

Now, having particular reference to the combined picture and sound film 33 as per Figures 13 and 14, the same is of the usual celluloid material having a gelatin coating upon one side thereof. In the present instance, this film includes two different picture series, the picture squares of one series occupying each alternate picture square of the film, while the pictures of the other series occupy the remaining alternate squares of the film. One of these picture series is denoted generally 34', while the other picture series is denoted generally 35' and for more accurately disclosing the exact nature of this film, the squares of the picture series 34' is marked with the numerals "1 to 7", while the picture squares of the other series is marked with the letters "a to g". The picture series 34' begins at one end of the film, while the picture squares of the remaining series begin at the opposite end of the film and as clearly shown in Figure 13, the picture squares of each series are arranged in up-side-down relation to each other. Upon the uncoated side of the film and adjacent one of the edges thereof is a sound groove 36', the sound waves of which are representative of the picture series 34'. It is to be understood that these sound waves are recorded simultaneously with the taking of the said picture series 34' for thereby providing an absolute synchronization therebetween. Upon the opposite edge of said film 33 is a similar sound groove 37, the waves of which are representative of the picture series 35', these waves being also recorded simultaneously with the taking of the picture series 35'. The center of the film 33 is formed with elongated openings 38 that are arranged between each alternate pair of picture squares, the same adapted for receiving the pins of a film drive element hereinafter to be described.

In Figures 10 and 11, there is shown a particular type of film box that is to be used in conjunction with my machine, this box designated 39 being of flat rectangular shape and embodying a top wall 40, bottom wall 41 and integral front, rear and side walls 42, 43 and 44, respectively. The top wall 40 is removable for obvious purposes and loosely journaled between the top and bottom walls and spaced from each other are a pair of film rollers 45. These rollers are each keyed upon shafts 46—46, the ends of the shafts projecting through the said top and bottom walls of the film box 39. The opposite ends of said shafts are equipped with cross plates 47 and rollers 48, respectively. The cross plate and roller of one shaft being arranged at the opposite side of the film box 39 with respect to the cross plate and roller of the other shaft. Adjacent the front wall 42 of the box 39 and substantially intermediate the end walls thereof is a roller 49 that is equipped with projecting pins 50 that engage through the openings 38 of the film 33, when the same is properly positioned within the box. This roller is also upon a shaft 51, the opposite ends of which project outwardly through the box and are equipped with cross plates 52. In actual practice, one end of the film 33 is secured in the usual manner to one of the rollers 45, this film being extended forwardly within the box and over a corner roller 53, and thence positioned over the said roller 49 and maintained in tight engagement therewith by other rollers 54 upon opposite sides of the roller 49. The film box also carries a further roller 55 adjacent the opposite front corner thereof, and over which the film is trained, the same being then directed rearwardly and secured to the remaining roller 45.

This film box 39 is equipped with a handle 56 and is adapted to be slidably positioned within the frame that is made up of the walls 19, 20, 21 and 22, the position of this box within the frame being more clearly shown in Figure 3. The top wall 40 of the box is provided at its front side and adjacent one side of the film roller 49 with a light opening 57, while the bottom wall 41 of the box is provided adjacent the opposite side of the roller 49 with a similar light opening 58, the front wall 42 of the box being provided forwardly of each light opening 57 and 58 with openings 57' and 58, respectively. These openings are adapted, at different positions of the box within the frame, to aline with the light opening 26 in the wall 21 of the frame for obvious purposes.

Splined upon the upper ends of the before mentioned shafts 12 and 16 are wheels 59 and 60, respectively. Each of these wheels being provided with a vertically projecting annular row of spaced pins 59' and 60', respectively. Each of these wheels is circumferentially grooved as more clearly shown in Figure 5 and in engagement with the groove of the wheel 59 are inwardly directed pins that are carried by the yoked end of a lever 61, this lever being pivoted at 62 to a standard 63 that is carried by or formed integrally with the base plate 6. The opposite end of this lever 61 is formed with a pendent leg 64 for purposes hereinafter described, and as a means for normally holding the said wheel 59 in a position downwardly upon its shaft as shown in Figure 5, there is provided a coiled spring 65 secured at one end to the lever and at its opposite end to the base plate 6.

Similar engaged with the groove in the wheel 60 are inwardly directed pins upon the yoked end of a lever 66, this lever being also similarly pivotally secured to a post 67 and formed at its inner end with a pendent leg 68. In this instance, this pendent leg 68 is equipped with a pair of projecting pins 69 between which engage one end of an arm 70 that extends laterally and is secured in any manner desirable to a rectilinearly movable bar 71 movable within standards 72. The front end of this bar has close contact with the pendent leg 64 of the lever 61, the opposite end thereof adapted to be engaged by a curved projection 73 upon the lower end of a flat like lever 74 that is pivotally secured to an open rectangular shaped metallic plate 75 that is supported a slight distance above the base plate 6.

In view of the foregoing, it will be obvious that when this flat like lever 74 is in a downwardly swung position as per Figure 4, the wheels 59 and 60 upon the shafts 12 and 16, respectively, will be in a position downwardly thereon due to the influence of the springs. It is to be understood that a spring, similar in all respects to the spring 65 is secured between the base plate 6 and the lever 66. When these wheels are in their downward position and the cover 23 of the before described frame is removed, the film box 39 may be slid within the frame, and after the same has been positioned therein, the cover 23 is applied, and the lever 74 swung upwardly to the position of Figure 3. This movement of the lever so effects the arm 70 and rod 71 as to raise the wheels 59 and 60 upon their respective shafts and consequently position the vertically directed pins 59' and 60' in engagement with the adjacent plate 52 of the shaft 51 of the film roller 50 and the plate 47 of the adjacent shaft 46 of the respective roller 45 whereby when the motor 7 is started, the rotation of these wheels 59 and 60 will cause a consequent unwinding of the film from one roller 45 to the opposite roller 45.

As a means for maintaining this lever 74 in the position shown in Figure 3, the frame cover 23 is provided with a lip 76 that is adapted to be engaged by a dog 77 carried by a lever 78 pivoted at 79 adjacent the upper end of the flat like lever 74.

Again, having reference to the prism 36, and as more clearly shown in Figure 15, the same is disposed or formed integral with the forward upwardly projecting ends 80 of a pair of rearwardly directed flat like bars 81. The opposite ends of these bars are secured to a cross rod 82 that is disposed for rocking movement in a pair of spaced standards 83 formed vertically upon the said base plate 6. As more clearly shown in Figure 3, the inner end of this rod 82 is formed with a pendent leg 84 that is in contact with a laterally directed pin 85 upon the said sliding rod 71, whereby after the film box 39 has been positioned and the flat like lever swung upwardly, a forward movement of said rod 71 will naturally cause a rocking movement of the rod 82, for thereby extending the prism 36 upwardly into the respective opening of either the top or bottom wall 40 or 41 of the said film box.

Secured to a post 86 that is upon the base plate 6 at a point adjacent the front wall 19 of the film box frame is a flat like curved spring 87 that is so positioned as to engage the adjacent roller 48 of its respective film roller shaft 46 when the box is slid forwardly within the frame, this spring thereby effecting a brake for the said respective film roller shaft, for preventing the free unwinding of the film from its respective roller. This spring further functions as a means for projecting the film box 39 a slight distance outwardly of the frame when the lever 74 has been swung downwardly.

The carriage 28 has rectilinear movement upon the bars 27, and it might be well to herein note that during the projection of one picture series of the film 33, the carriage moves in a certain horizontal zone to permit the projection of but one picture series, while during the projection of the other picture series, the said carriage moves in a different horizontal zone. This is necessary for the proper projection of the pictures and as this carriage moves in a direction similar to the direction of movement of the film, the opening 30 of the plate 29 of the carriage will be in position forwardly of one of the picture squares of that particular series for permitting the light rays to project through that particular square. After the carriage has moved a certain distance in a direction similar to the direction of movement of the picture film, the same is released, and then snapped forwardly, whereby the opening of the said plate is positioned forwardly of the next picture square of that particular series, whereby the light passes therethrough and projects the picture, and so on until all of the picture squares of that particular series have been projected. It is therefore absolutely necessary that the said carriage move in different horizontal zones during the projection of the different picture series upon the film, and the mechanism for controlling the rectilinear movement of the carriage, is as follows:—

Disposed upon the base plate 6 and secured thereto in any manner desirable and surrounding the shaft 12 is a circular strip of metal 88 that is formed with a cut out portion as more clearly shown in Figure 6. The underside of this metallic strip is mortised at its inner edge for receiving the flange 89 of a disk 90 that has free rotary movement in opposite directions around the shaft 12. This disk is formed with a central vertically projecting sleeve 91 that surrounds said shaft 12, and has loosely positioned thereon a half-moon shaped plate 92. Pivotally secured to this plate 92 as at 93 is a somewhat arcuate-shaped lever 94, a portion of which is maintained in normally close contact with the said sleeve 91 of the disk 90, through the medium of a band spring 95. The inner side of this lever 94 is formed with a hook shaped cut out 96, that is adapted to receive successively, pendent spaced pins 97, of a collar 98, keyed to the shaft 12 beneath the before described splined member 59, as the shaft 12 is being rotated under the influence of the motor 7. Connected at one end to the half-moon shaped plate 92 and at its opposite end to the said carriage 28 is a flexible steel band 99, that is adapted to be wound onto the plate 92, as the same rotates in one direction. As a means for normally maintaining the carriage 28 in the position of Figure 4, there is provided a band spring 100 secured at one end to the before mentioned post that carries the spring 87 and that engages at its opposite end a convenient point of the carriage. The disk 90 is formed with a laterally extending arm 101, to which is pivotally secured one end of a connecting rod 102, the opposite end of this rod being pivotally secured to one arm of a bell crank 103. This bell crank is suitably pivotally secured to the base plate 6, and is provided upon its opposite arm with an upwardly extending actuating knob 104 that is slidable within an arcuate slot 105 in the before mentioned plate member 75. From a consideration of Figure 6, it will be at once apparent that the arm 101 of the disk 90 has movement between the opposite ends of the metallic strip 88.

It is preferable that the opposite ends of this arcuate slot 105 be marked with the characters "1" and "2", as per Figure 2, and that the opposite sides of the film box 39 be also similarly marked whereby the said knob may be thrown to different positions for permitting the carriage to move in different horizontal zones during the projection of the different picture series upon the film strip 33. For permitting the marking on the film box 39 to be viewed, the cover plate 23 of the before described frame is formed with a central opening 23', Figure 2.

For effecting the movement of the half-moon shaped plate 92 in one direction when the disk 90 is moved in a similar direction, there is provided a curved spring 106 that is secured at one end to a post 107 upon the said disk 90, the opposite end of this spring contacting with the adjacent end of the said plate 92. This spring 106 also serves as a flexible stop for the plate 92 as the same is rotated in a reverse direction, under the influence of the carriage controlled spring 100.

Assuming that the film box 39 has been positioned in its frame in such a manner as to project one of the picture series, this picture series being indicated on the film box "2", Figure 2. It is therefore necessary that the before mentioned knob 104 be swung to the position in this figure, which will rotate the disk 90 around the shaft 12 to the position of Figure 6 for consequently sliding the carriage 28 slightly rearwardly upon the bars 27 for permitting the same to move in opposite directions in a certain horizontal zone for permitting of the projection only of the picture squares of that particular picture series. After the film box has been positioned and the lid 23 of the frame applied, and the lever 74 swung upwardly as per Figures 1 and 2, the pins 59' of the wheels 59 and the pins 69' of the wheel 60 will engage the plates 52 and 46 of the respective roller shafts 51 and 46. Upon the starting of the motor 7, which is of course, in circuit with a suitable source of supply, this circuit adapted to be closed by a lever 108 of a desirable form of switch, the shafts 12 and 16 will be rotated. In view of the forwardly projecting pins 50 upon the wheel 49 projecting through the openings 38 in the film 33, and the connection between the shafts 12 and 16 this film will be effectively unwound from one of the rollers 45 and be consequently wound upon the opposite roller 45, the connection between the shafts 12 and 16 permitting of a slippage of the latter mentioned shaft with respect to the first mentioned shaft as the film becomes wound upon the said roller 45 for obvious purposes. Upon the positioning of the film box 39, the opening of the plate 29 will be directly forwardly of the first picture square of the particular picture series to be projected, and naturally as the shaft 12 rotates, a certain one of the pins 97 will engage the edge of the notch 96 in the arcuate shaped lever 94, and cause a rotation of the half-moon shaped plate 92. A movement of this plate 92 will occasion a movement of the carriage 28 in the direction of movement of the film and after this carriage has been moved a certain distance inwardly, this arcuate lever 94 will engage a vertically projecting pin 109 upon the disk 90 for releasing the said lever from the pin, which will thereby permit the carriage to snap forwardly under the influence of the spring 100 until the notch of the lever 94 receives another pin, it being understood that the reverse movement of the carriage is of a distance equivalent to the distance apart of the picture squares of the respective picture series upon the film 33.

After one picture series has been projected, the motor is stopped and the film box reversely positioned within the frame, after which the knob 104 is moved to an opposite position within the arcuate slot 105 for thereby permitting the movement of the carriage 28 in a different horizontal zone, whereby the plate 29 of this carriage will accompany the movement of the respective picture squares of that picture series across the light opening 26 in the side wall 21 of the frame.

Directly forwardly of the film roller 49, the front wall 42 of the film box 39 is provided with an opening 109, into which extends the stylus 110 of a sound box 111. As more clearly shown in Figure 10, this stylus has close contact with the sound groove upon the film 33 that is at the upper edge of the film during the projection of that particular picture series, it being noted that this stylus is at a substantial angle to the longitudinal axis of the film, for obvious purposes. This stylus 110 is maintained in engagement with the sound groove of the film through the medium of a spring 110'.

The sound box 111 is carried upon the upper end of a hollow tone arm 112, that is loosely positioned within a sleeve 113 that is received within an opening in the base plate 6, and terminates at its upper end in a flange 114. In this instance, it is necessary that the open frame plate 75 be provided with an opening in alinement with said sleeve 113 for permitting of the passage of the tone arm therethrough, as more clearly shown in Figure 3. Connected at its upper end in a suitable manner to the tone arm 112 is a rod 115 that is slidable through a cross guide 116 formed within the lower end of said sleeve 113. In position beneath the lower end of this rod 115 is a wedge-shaped plate 117 that is formed upon one end of one arm 118 of a bell crank 119, Figure 12. This bell crank is pivotally secured beneath the sleeve 113, and its other arm 120 extends beneath the base plate for a portion of its length, and is then bent upwardly and outwardly to provide an extension 121 that projects up through the base plate 6, and engages through an opening in the wall 22 of the film box frame, this end being provided with a point 122 and an operating knob 123. The open shaped frame plate 75 is provided with graduations 124 that are adjacent said pointer 122, and it will be at once apparent that by swinging the bell crank upon its pivot, the wedge-shaped plate 117 will be moved inwardly and outwardly beneath the lower end of the rod 115, whereby the stylus 110 of the sound box 111 may be properly guided into the respective sound groove of the picture strip 33 as the proper series is being projected. As shown by the dotted lines in Figure 1, the tone arm 112 may be, and preferably is, in communication with a tone arm extension 125 that has its opposite end positioned within an opening 126 in the front wall of the casing 5, this opening adapted to in turn receive a phonographic horn of desirable form and size.

Detachably secured to one side of the casing 5 is a laterally projecting supporting arm 127 that carries at its outer end a lamp bulb socket 128 and positioned within this socket is preferably a stereopticon bulb 129 that is disposed within a sectional metallic globe 130, this globe being provided internally with a reflector 131 immediately behind the said bulb 129. The inner side of the globe 130 is provided with a light opening in communication with which is a hood 132 that carries a pair of condensing lenses 133. The front end of this hood surrounds the light opening 26 in the wall 21 of the film box frame as per Figure 4, and serves as a means for directing the light rays from the bulb to the picture strip. The bulb 129 has electrical connection with any suitable source of electric supply.

From the above described construction, applicant provides a reciprocating projecting or light rectifying means adapted for reciprocating movement in the path of projection of a beam of light, across which is movable a picture strip, having a uniform and continuous movement, said means being adapted to control the projection of the light and the rectification thereof, in order to intermittently project a predetermined series of pictures on said movable strip, in succession, onto a suitable screen, for producing a moving picture. Simultaneously with the intermittent projection of a predetermined series of pictures from said strip, a suitable sound reproducing means, as above described synchronously reproduces sound recorded on said continuously movable strip, incident to the pictures being projected therefrom. This construction forms an important feature of the machine, in order that the projection of pictures and reproduction of sound can be accurately and synchronously reproduced.

Another important feature of the invention resides in the reversible film carrier or box which is reversible in the projecting machine, so that a film having a series of pictures arranged in alternate relation and starting from opposite ends of the film may be projected by the machine, the film having a movement through the machine, during the projection of the pictures and the sound incident thereto, of each series in the same direction, it being necessary to reverse the position of the film box, for the projection of each picture series.

In view of the above description, it will at once be apparent to those skilled in the art that I have provided a device for projecting pictures and reproducing sound in synchronism, and although I have herein set forth this mechanism as comprising certain structural elements, it is nevertheless to be understood that in the future practice of the device, departures may be had therefrom without affecting the spirit and scope of the appended claims.

Having thus described my invention, what I claim as new, and desire to secure by Letters-Patent, is:

1. A machine for intermittently projecting a selected picture series and sound incident thereto from a film having a pair of picture series and an independent sound record for each series, comprising means for continuously and uniformly feeding the picture strip through the machine, reciprocating means for selecting one of said picture series operated by the first mentioned means, optical projecting and rectifying means for the selected picture series, and means for reproducing the sound for said selected picture series in synchronism with the projection of the pictures.

2. A machine for intermittently projecting a selected picture series, and sound incident thereto from a film having a pair of picture series arranged in alternate relation and a sound record extending throughout the length of the film for each picture series, comprising means for continuously and uniformly feeding the picture strip through the machine, reciprocating means for selecting one of said picture series, optical projecting and rectifying means for the selected picture series, and means for reproducing the sound incident to the selected picture series in synchronism therewith.

3. A machine for intermittently projecting a selected picture series and sound incident thereto from a film having a pair of picture series in which the pictures are arranged in alternate relation, and wherein the film strip is provided with an independent sound record for each picture series, said sound record for each picture having a length substantially greater than the length of the picture, comprising means for continuously and uniformly feeding the picture strip through the machine, movable means operable to select one of said picture series to be projected, means for projecting the selected series of pictures, and means for reproducing the sound incident to said selected picture series in synchronism with the projection of the pictures.

4. A machine for intermittently projecting a series of pictures and sound incident thereto from a film having a sound record groove formed therein containing the sound record incident to a picture series, comprising means for continuously and uniformly feeding the picture film through the machine, means movable with the film in a predetermined manner for successively selecting the pictures of the series for projection, optical projecting and rectifying means for projecting the selected pictures of said series, and means adapted for operation in the sound record groove of the film having a predetermined position with respect to the picture selecting means, and operable for reproducing the sound record in synchronism with the pictures.

5. A machine for intermittently projecting a series of pictures and sound incident thereto from a film having a series of pictures thereon and a sound record groove formed therein, containing the sound record incident to said series of pictures, comprising means for continuously and uniformly feeding the picture strip through the machine, movable means for selecting the pictures to be projected having a predetermined movement with respect to the continuously and uniformly moving film strip, optical projecting and rectifying means for the selected pictures, and mechanically operated means mounted in predetermined relation to the picture selecting means and engaging in the sound groove of said picture strip for reproducing the sound recorded in said groove in synchronism with the picture.

6. A machine for intermittently projecting a selected picture series and sound incident thereto from a film having a plurality of picture series and independent sound records for each series, comprising means for continuously and uniformly feeding the picture strip thru the machine, movable picture selecting means operable in a predetermined relation and zone relative to the continuously and uniformly moving film strip for selecting a series of pictures to be projected, optical projecting and rectifying means for the selected picture series, sound reproducing means operable by the sound record on said film incident to the selected picture series, and means for adjusting the zone of operation of the picture selecting means with respect to the sound reproducing means.

7. A machine for intermittently projecting a selected picture series and sound incident thereto from a film having a plurality of series of pictures and a sound record groove formed therein, comprising means for continuously and uniformly feeding the picture strip through the machine, picture selecting means reciprocable within a predetermined zone for selecting the pictures to be projected, optical projecting and rectifying means for the selected pictures, means operated by the first mentioned means for operating the picture selecting means, and sound reproducing means having a fixed position in said machine and operable by the sound record groove in the film.

8. A machine for intermittently projecting a selected picture series and sound incident thereto from a film having a plurality of series of pictures thereon, and a sound record groove formed therein for said series of pictures, comprising means for continuously and uniformly feeding the picture strip through the machine, picture selecting means reciprocable within a predetermined zone for selecting each picture of the series to be projected, optical projecting and rectifying means for projecting the selected pictures of the series, means operable by the first mentioned means for producing the reciprocating motion of the picture selecting means, means for adjusting the last mentioned means to vary the zone of operation of the picture selecting means, and means for reproducing the sound incident to said picture series operated by the sound record on the film strip having a fixed relation with respect to the operating means for the film strip.

9. A machine for intermittently projecting a selected picture series and sound incident thereto from a film strip having a plurality of series of pictures thereon and a sound record groove formed in the strip in which the sound record has a predetermined relation with respect to the picture with which it corresponds, comprising means for continuously and uniformly feeding the picture strip thru the machine, picture selecting means reciprocable within a predetermined zone and in relation with respect to said film strip during its uniform and continuous movement, optical projecting and rectifying means for projecting the selected pictures of the series, sound reproducing means having a fixed relation with respect to the first mentioned means for reproducing the sound recorded in the sound groove on said film strip, and manually operable means for adjusting the zone of operation of the picture selecting means relative to the first mentioned and sound reproducing means for obtaining the same predetermined relation between the sound reproducing means and the picture selecting means that exist between the sound record and the pictures on the film strip for synchronizing the sound reproduction and the picture projection.

10. A machine for intermittently projecting a series of pictures and sound incident thereto from a film strip having a series of pictures thereon and a sound record groove formed therein with the sound record in a predetermined relation to the corresponding picture, comprising rotary operating means for engaging the film strip and continuously and uniformly feeding said strip through said machine, picture selecting means reciprocable in a predetermined relation with respect to the film strip during movement for successively selecting pictures of a series for projection, optical projecting and rectifying means for the selected pictures of the series, sound reproducing means operable in the sound record groove within the zone of engagement of the rotary operating means for feeding the film, and means for adjusting the zone of operation of the picture selecting means relative to the sound reproducing means for synchronizing the projection of the pictures and sound incident thereto.

11. A machine for intermittently projecting a selected picture series and sound incident thereto from a film strip having a plurality of picture series, and a sound record groove therein for said picture series, comprising rotary means for engagement with the film to continuously and uniformly feed the picture strip through the machine, picture selecting means reciprocable in a predetermined relation with respect to the film strip in the movement thereof for selecting each picture to be projected, optical projecting and rectifying means for the selected pictures of the series, motion transmitting means between the rotary means first mentioned and the picture selecting means for converting the rotary motion of the first mentioned means into reciprocating motion for operating the picture selecting means within a predetermined zone, manually operated means for adjusting the operation of the last mentioned means and means for reproducing the sound incident to the projected pictures.

12. A machine for intermittently projecting a selected picture series and sound incident thereto from a film strip having a plurality of picture series thereon, and an independent sound record groove for said series formed therein, comprising means for continuously and uniformly feeding the picture strip through the machine, a carrier mounted for reciprocating movement relative to the film during movement, a picture selector mounted on the carrier and operable for selecting the pictures from the film strip for successive projection, light projecting means mounted on the machine for projecting light through the film, picture projecting and rectifying means for projecting and rectifying the light for the selected pictures, sound reproducing means operable in the sound record groove in the film strip for reproducing the sound record in the groove, and manually operable means for transmitting motion from the first mentioned means to the carrier to reciprocate said carrier, said manually operable means being adapted to vary the zone of reciprocation of the carrier for synchronizing the pictures and the sound record incident thereto.

13. A machine for intermittently projecting a selected picture series and sound incident thereto from a film strip having a plurality of picture series thereon and a sound record groove formed therein, comprising means for continuously and uniformly feeding the picture strip through the machine, picture selecting means for the pictures of the series to be projected operable in said machine, optical projecting and rectifying means for the selected pictures of the series, means operable in the sound record groove in predetermined relation with the picture selecting means for reproducing the sound incident to said pictures recorded in said groove, and means for adjusting the position of said sound reproducing means in said machine relative to said film strip and sound record groove.

14. A machine for intermittently projecting a selected picture series and sound incident thereto from a film having a plurality of series of pictures thereon and a sound record groove formed therein, comprising means for continuously and uniformly feeding the film strip through the machine, picture selecting means reciprocable within a predetermined zone for selecting pictures to be projected from said film strip, optical projecting and rectifying means for the selected pictures of the series, means for reproducing the sound incident to said pictures operable in the sound record groove of said film strip, and means for adjusting the position of the sound reproducing means laterally relative to the plane of movement of the picture selecting means.

15. A machine for intermittently projecting a selected picture series and sound incident thereto from a film having a plurality of series of pictures thereon and a sound record groove formed therein for said series of pictures, comprising a film support removably and reversibly mounted on said machine operably supporting said film, means for continuously and uniformly feeding the film in said film support having disengageable connection with said film support, picture selecting means in said machine reciprocable in a predetermined relation with the film in said support for selecting the pictures of the series to be projected, optical projecting and rectifying means in the machine for projecting the selected picture of the series, and sound reproducing means mounted in the machine and operable to automatically engage in the sound record groove of the film strip for reproducing the sound record in said groove in synchronism with the projection of the pictures.

16. A machine for intermittently projecting a selected picture series and sound incident thereto from a film strip having a pair of picture series arranged in alternate and reversely progressing relation and having independent sound record grooves for each picture series formed therein containing a sound record incident to and in synchronism with the picture, comprising a film support reversibly and detachably mounted on said machine operably mounting said film, means for removable engagement with the film mounting and operating means in the support operable in one direction for continuously and uniformly feeding the film in said support, picture selecting means operable in said machine and relative to the film strip in a predetermined manner for selecting one series of pictures to be projected, optical projecting and rectifying means for the selected picture series, sound reproducing means adapted to operate in said sound grooves in said film automatically when the film support is attached to said machine for reproducing the sound incident to the selected picture series in synchronism therewith.

17. A machine for intermittently projecting a selected picture series and sound incident thereto from a film strip having a pair of picture series arranged in alternate and reversely progressing relation and having independent sound record grooves for each picture series formed therein containing a sound record incident to and in synchronism with the picture, comprising a film support reversibly and detachably mounted on said machine operably mounted in said film, means for removable engagement with the film mounting and operating means in the support operable in one direction for continuously and uniformly feeding the film in said support, picture selecting means operable in said machine and relative to the film strip in a predetermined manner for selecting one series of pictures to be projected, optical projecting and rectifying means for the selected picture series, sound reproducing means adapted to operate in sound grooves in said film automatically when the film support is attached to said machine for reproducing the sound incident to the selected picture series in synchronism therewith, and means controlled by the film support automatically operable to secure engagement of the means for feeding the film in said machine with the film supporting means in the operative mounting of the film supporting means on said machine.

In testimony whereof I affix my signature.

FERDINAND VON MADALER.